United States Patent
He et al.

(10) Patent No.: US 8,602,308 B2
(45) Date of Patent: Dec. 10, 2013

(54) IMAGING DEVICE HAVING LIGHT FIELD SENSOR

(75) Inventors: Duanfeng He, Stony Brook, NY (US);
Vladimir P. Gurevich, Smithtown, NY (US); David P. Goren, Smithtown, NY (US); Nong-Qiang Fan, Holbrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/334,428

(22) Filed: Dec. 22, 2011

(65) Prior Publication Data
US 2013/0161399 A1 Jun. 27, 2013

(51) Int. Cl.
*G06K 7/10* (2006.01)

(52) U.S. Cl.
USPC .............................. 235/462.41; 235/462.42

(58) Field of Classification Search
CPC .................................................. G06K 7/10693
USPC .............. 235/462.41, 462.42, 462.43, 462.09
See application file for complete search history.

(56) References Cited

U.S. PATENT DOCUMENTS

| | | | | |
|---|---|---|---|---|
| 5,298,366 A * | 3/1994 | Iwasaki et al. | ................. | 430/321 |
| 6,307,243 B1 * | 10/2001 | Rhodes | .......................... | 257/432 |
| 6,773,142 B2 * | 8/2004 | Rekow | ........................... | 362/259 |
| 2008/0290383 A1 * | 11/2008 | Dunne et al. | .................. | 257/292 |
| 2009/0147379 A1 * | 6/2009 | Li et al. | ......................... | 359/741 |
| 2009/0160975 A1 | 6/2009 | Kwan | | |
| 2011/0180695 A1 * | 7/2011 | Li et al. | ......................... | 250/216 |

OTHER PUBLICATIONS

Wikipedia., "Light-field camera," Accessed at http://en.wikipedia.org/wiki/Plenoptic_camera, accessed on Aug. 18, 2012, pp. 4.
"Light Field Photography with a Hand-held Plenoptic Camera" by Ren Ng, Marc Levoy, Mathieu Bredif, Gene Duval, Mark Horowitz, Pat Hanrahan from Stanford Tech Report CTSR Feb. 2005.
International Search Report and Written Opinion dated Apr. 19, 2013 in related case PCT/US2012/069658.

* cited by examiner

*Primary Examiner* — Ahshik Kim
(74) *Attorney, Agent, or Firm* — Nong-Qiang Fan

(57) ABSTRACT

A method of imaging a target object with an imaging reader. The method includes the following: (1) detecting light from the target object through a lens arrangement with an image sensor to generate light-field data; (2) generating a stream of image data including image data representing an expected in-focus image of the target object, and (3) processing the expected in-focus image of the target object to decode a barcode on the target object. The image sensor includes an array of photosensitive elements and an array of microlenses that overlays the array of photosensitive elements located at a focus plane of the microlens.

26 Claims, 22 Drawing Sheets

*FIG. 13A*

IMAGING DEVICE HAVING LIGHT FIELD SENSOR

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

SUMMARY

In one aspect, the invention is directed to a method of imaging a target object with an imaging reader. The method includes the following: (1) detecting light from the target object through a lens arrangement with an image sensor to generate light-field data; (2) generating a stream of image data including image data representing an expected in-focus image of the target object, and (3) processing the expected in-focus image of the target object to decode a barcode on the target object. The stream of image data is generated from the light-field data. The image sensor comprises (1) an array of photosensitive elements and (2) an array of microlenses that overlays the array of photosensitive elements with a uniform spacing, wherein a microlens covers multiple photosensitive elements each located at a focus plane of the microlens and each receiving light through the microlens to function as a sub-pixel.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 13A-13B illustrate how to construct from the light-field data a constructed image with good focus on all points on an unknown surface in accordance with some embodiments.

Figure 1:
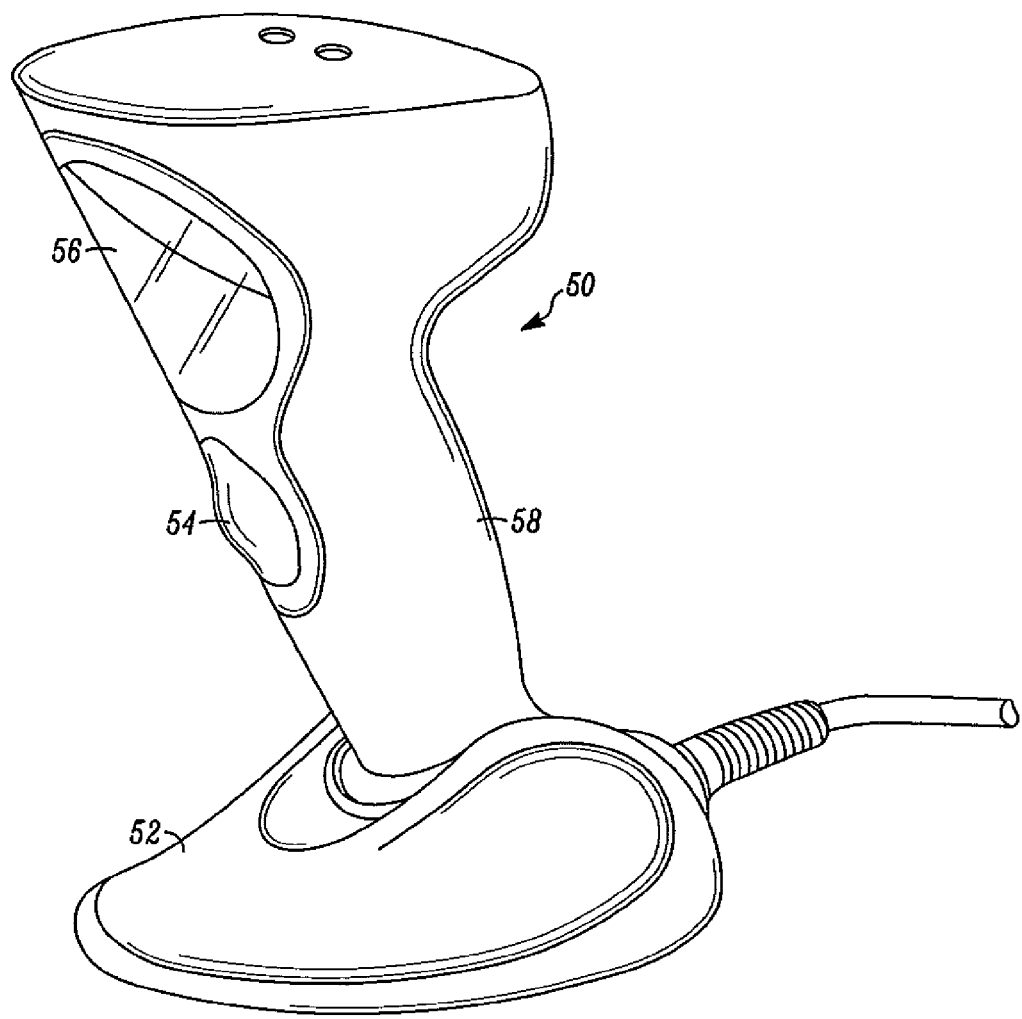
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link. In still other implementations, the imaging scanner 50 can be part of a mobile computer, such as, a smartphone or a tablet computer.

Figure 2:
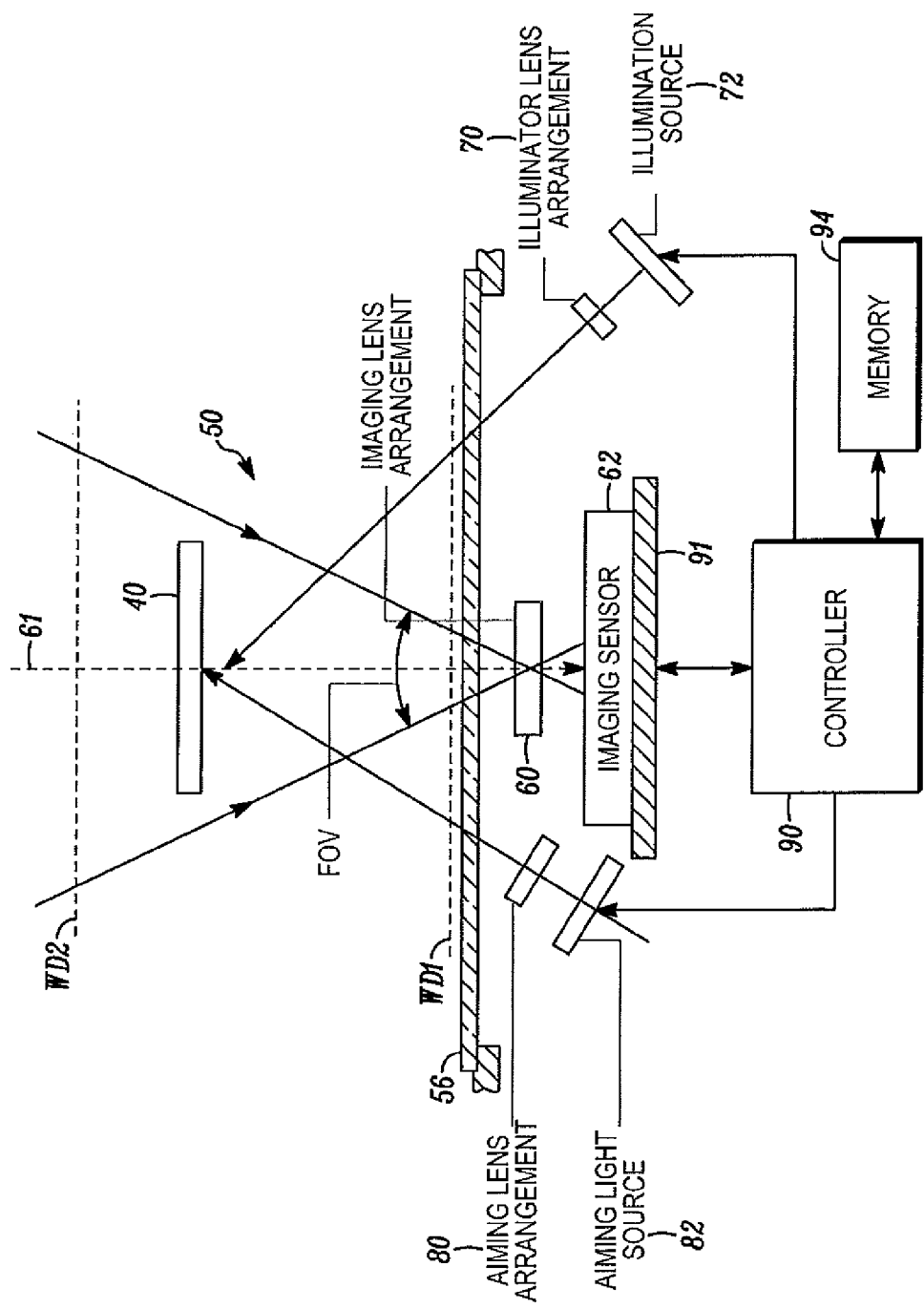
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming lens arrangement 80 positioned in front of an aiming light source 82; and (4) a controller 90. In FIG. 2, the imaging lens arrangement 60, the illuminating lens arrangement 70, and the aiming lens arrangement 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens arrangement 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3A:
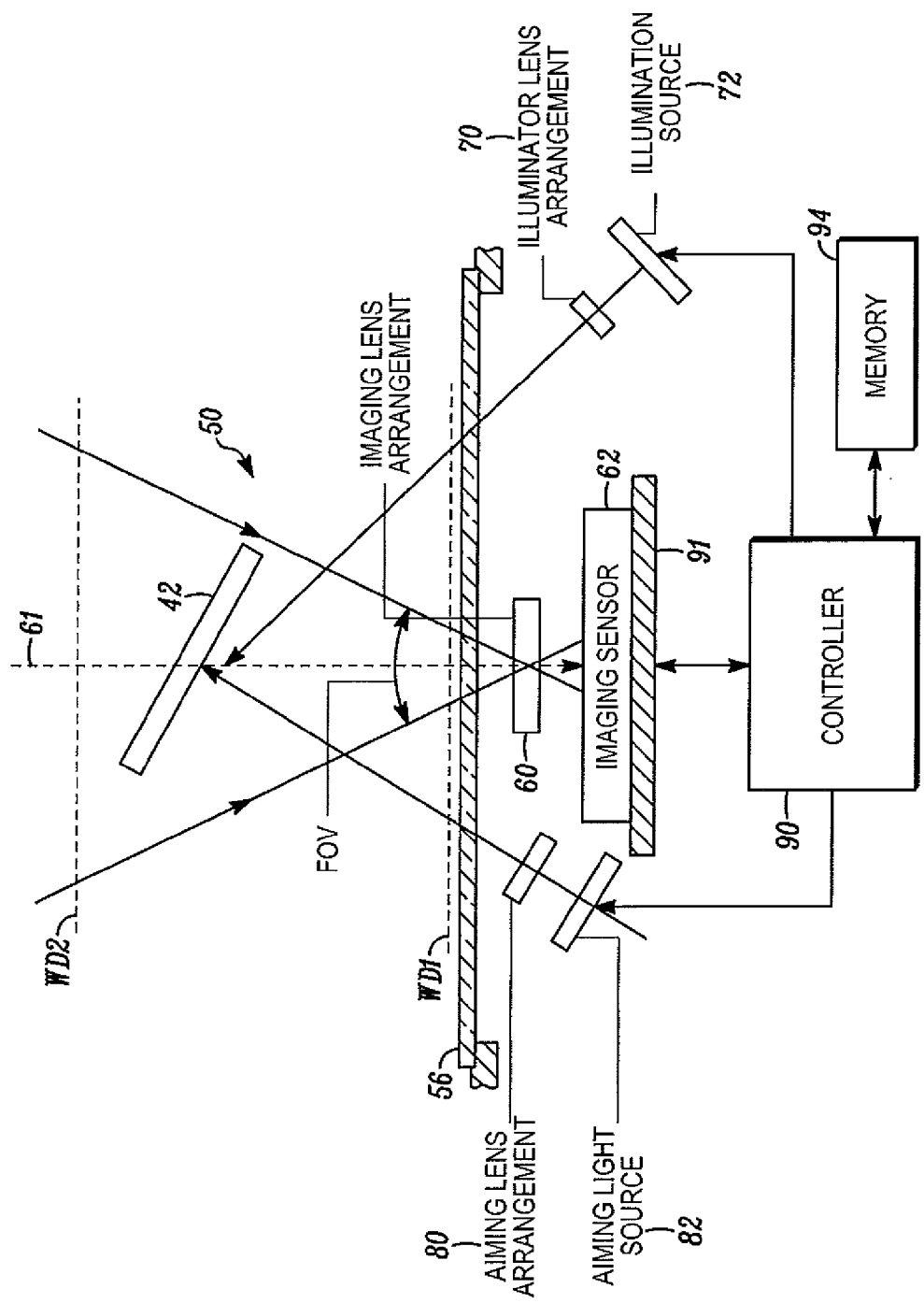
FIGS. 3A-3B depict that the optical axis of the imaging sensor are not perpendicular to the surface of the barcode.
Figure 3B:
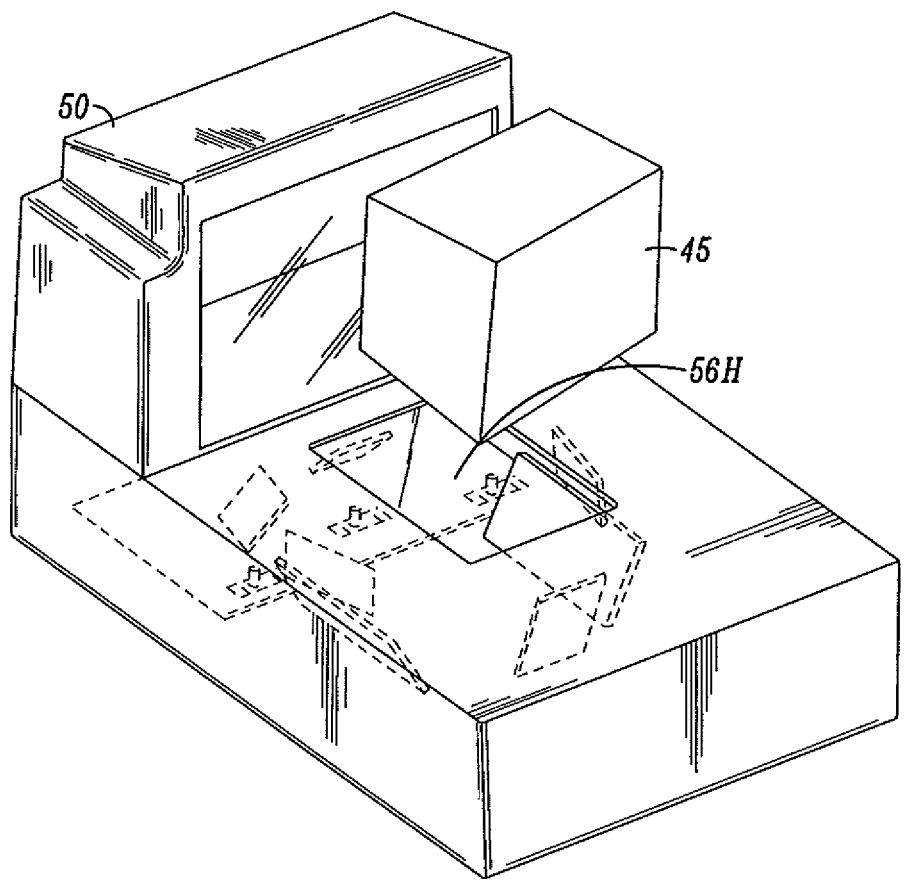

In FIG. 2, the barcode 40 is on a surface that is perpendicular to the optical axis 61 of the imaging sensor 62. When the imaging lens arrangement 60 is properly adjusted, it is possible to position the focus plane of the imaging sensor 62 substantially close to the surface of the barcode 40 and to bring the entire barcode into focus. In some situations, as shown in FIG. 3A, the optical axis 61 of the imaging sensor 62 are not perpendicular to the surface 42 of the barcode; in these situations, the focus plane of a conventional imaging sensor is not parallel to the surface 42 of the barcode, and parts of the surface 42 may not be in perfect focus when imaged with the imaging sensor 62. In another example, as shown in FIG. 3B, a package 45 in the form of solid rectangle is scanned across a bi-optic workstation 50, with the bottom surface of the package parallel to the horizontal window 56H of the bi-optic workstation 50. Because the optical axis of the imaging sensors in the bi-optic workstation 50 generally are not perpendicular to the horizontal window 56H, the optical axis of the imaging sensors are also not perpendicular to the bottom surface of the package 45. In the situation as shown in FIG. 3B, when a barcode is located on the bottom surface of the package 45, parts of this barcode may not be in perfect focus when imaged with the imaging sensors in the bi-optic workstation 50. It is generally desirable to bring all parts of a barcode into focus even if the surface of the barcode is titled respect to the optical axis of the imaging sensor.

Figure 4A:
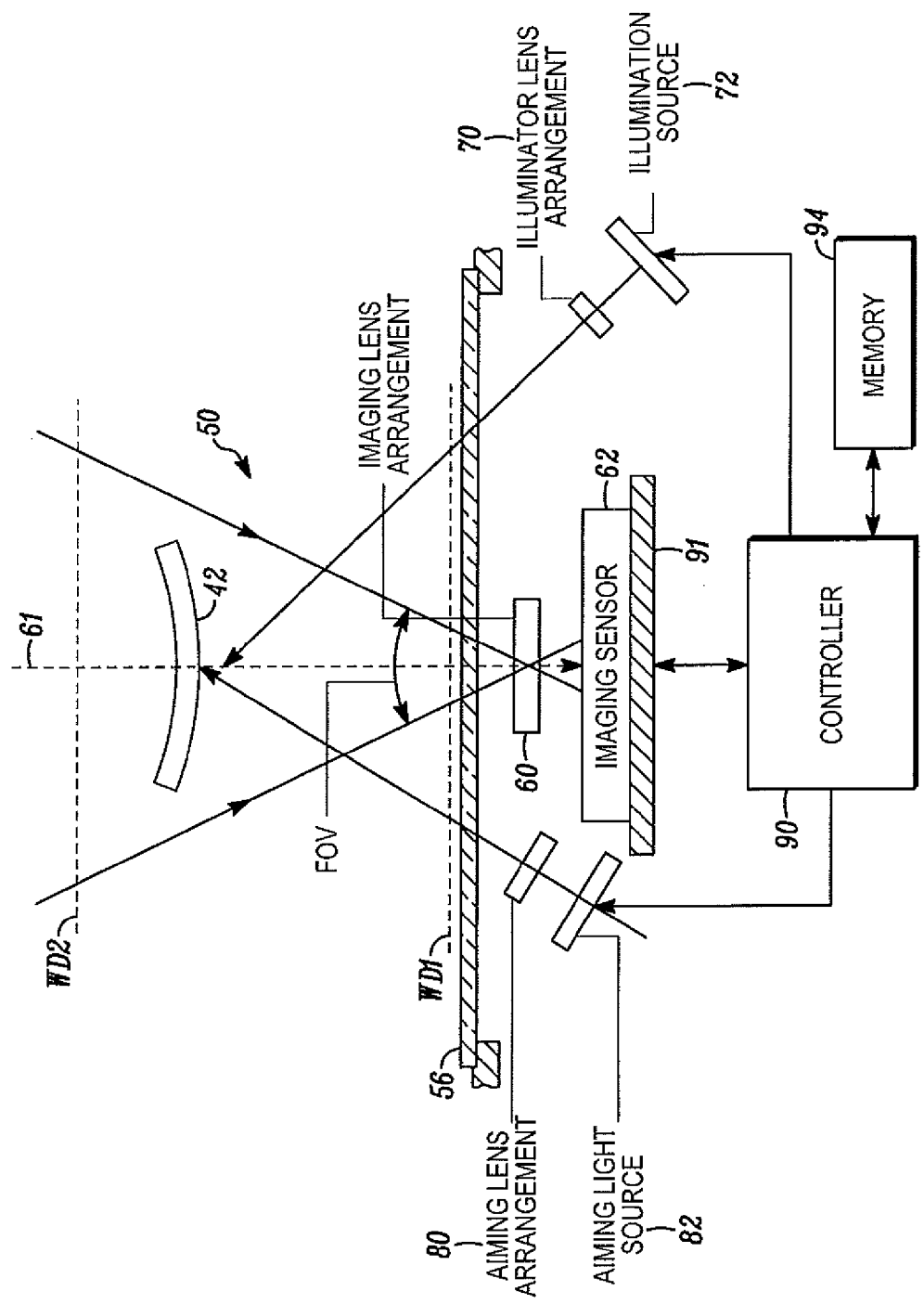
FIGS. 4A-4C depict that the barcode can be located on a curved surface.
Figure 4B:
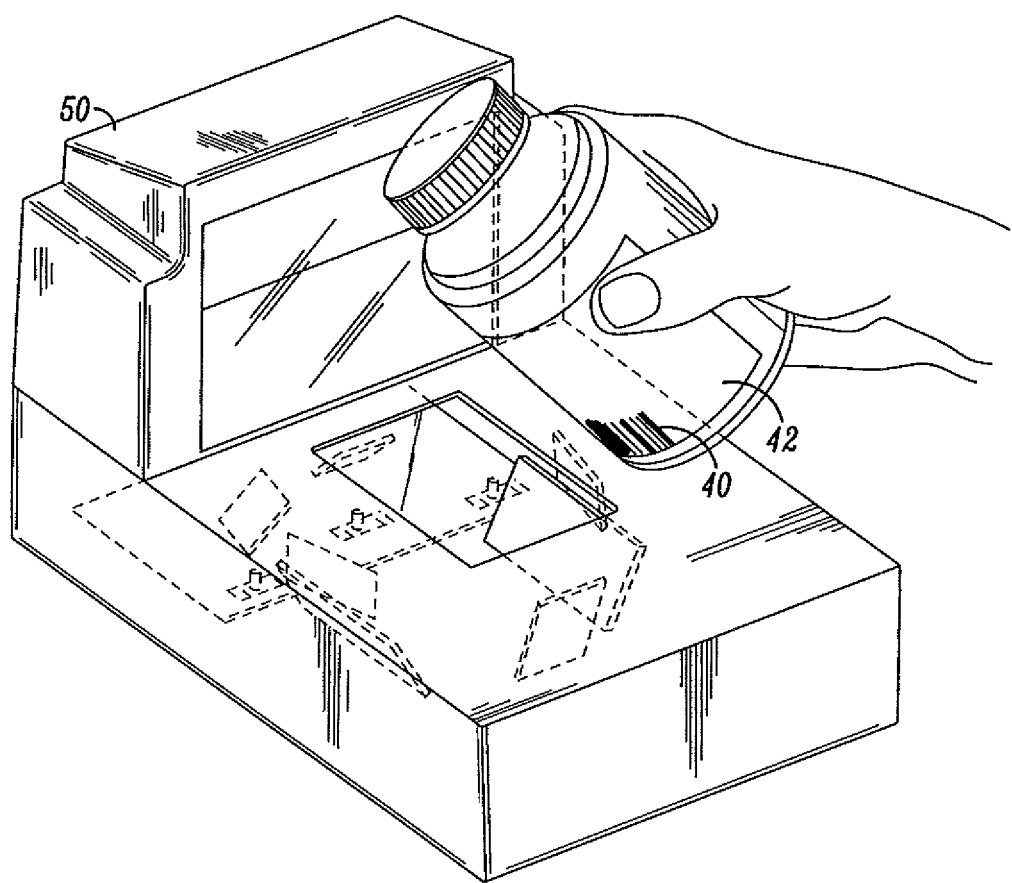
Figure 4C:
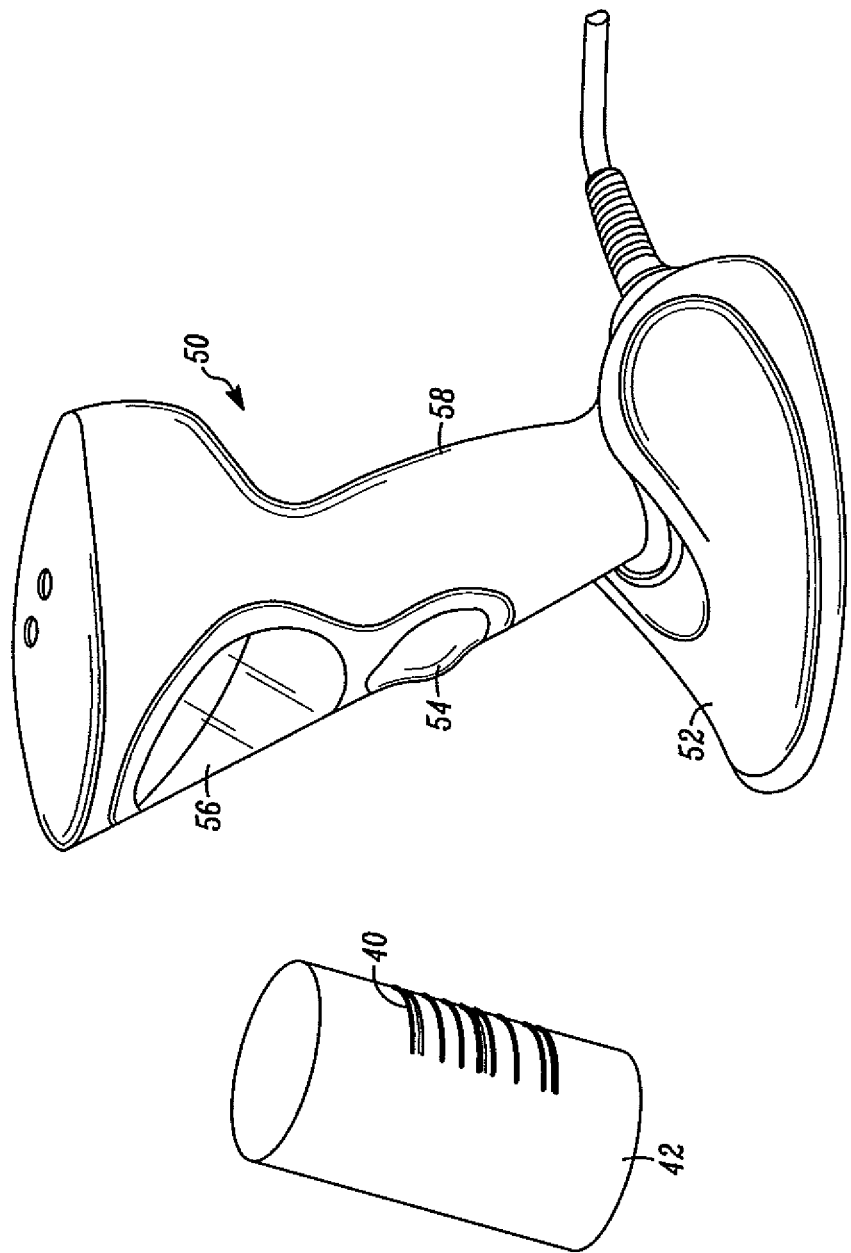
Figure 5A:
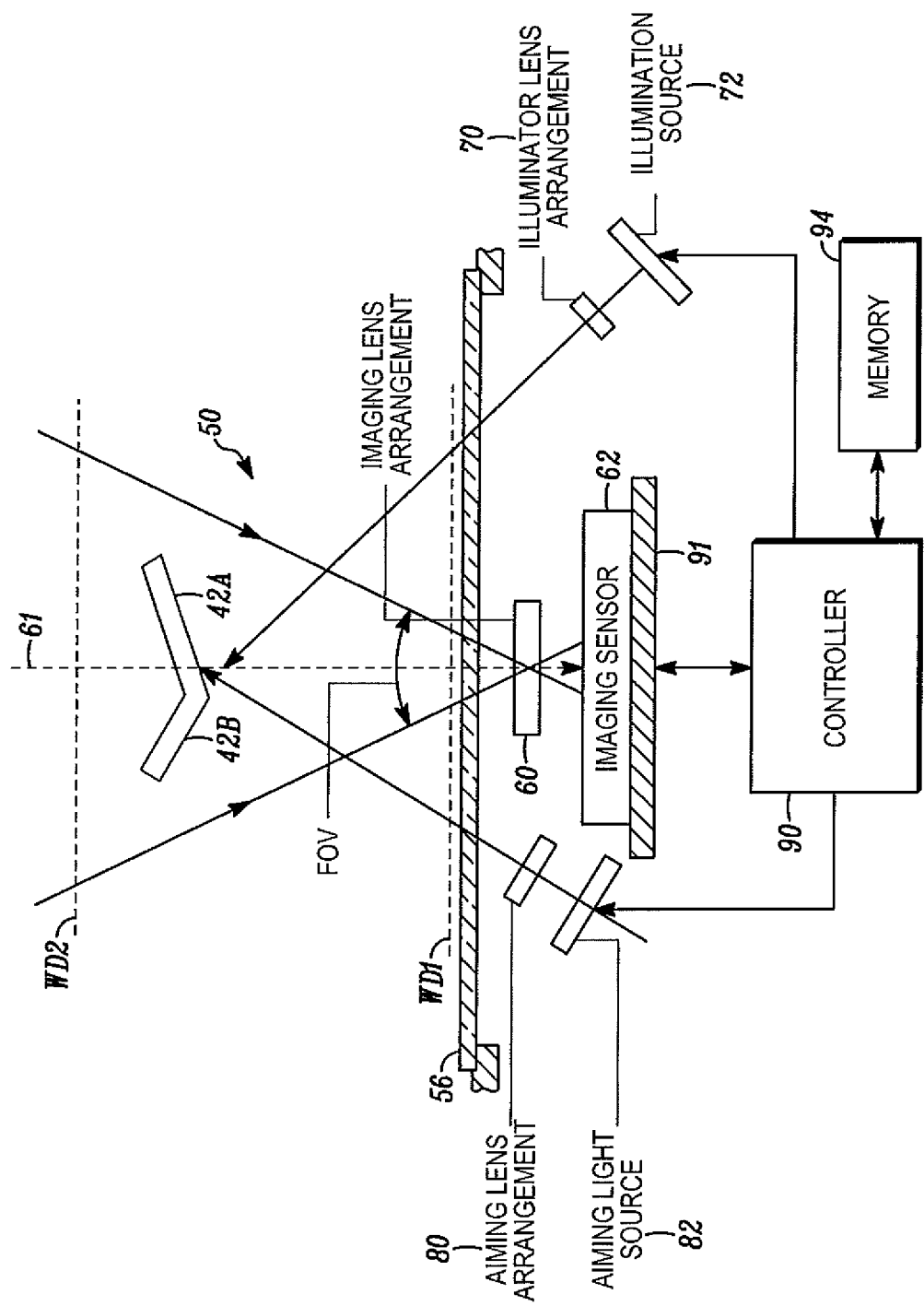
FIGS. 5A-5B depict that one part of the barcode can be on a first surface and another part of the barcode can be on a second surface.
Figure 5B:
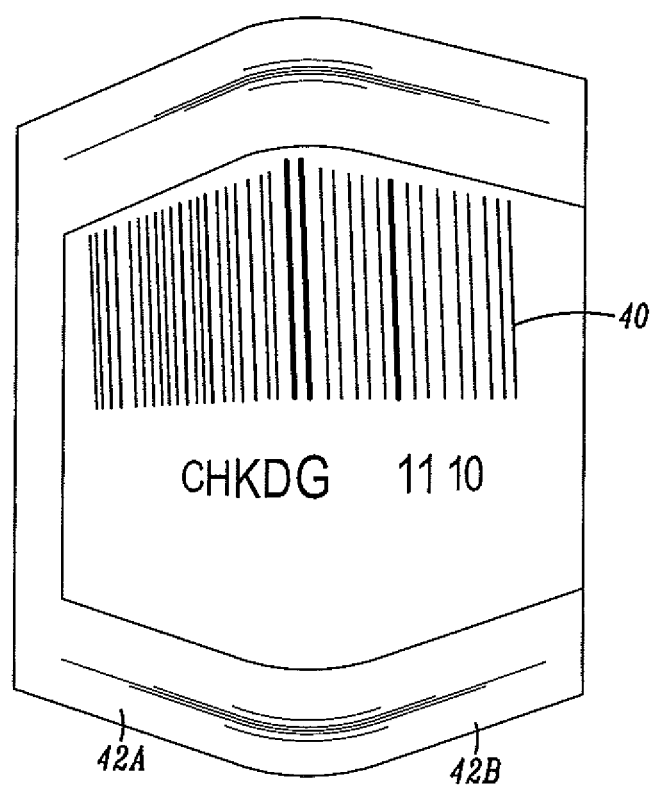

In other situations, as shown in FIGS. 4A-4C, the barcode 40 is located on a curved surface 42. In these situations, parts of the barcode 40 may not be in perfect focus when imaged with the imaging scanner 50 in which a conventional imaging sensor is used. In still other situations, as shown in FIGS. 5A-5B, the barcode 40 is located on multiple surfaces. For example, if a shipping label is attached to an edge of the package, the barcode 40 on the shipping label is practically located on a bended surface and it may appear to be sitting on multiple surfaces. In FIGS. 5A-5B, one part of the barcode 40 is on a surface 42A, and another part of the barcode 40 is on a surface 42B. When this barcode 40 is imaged with the imaging scanner 50, parts of the barcode 40 barcode may not be in perfect focus. It is generally desirable to bring all parts of a barcode into focus even if the barcode is located on a curved surface or on a bended surface.

The present disclosure describes some methods and apparatus for enabling the imaging scanner to focus on a barcode on an inclined surface, on a curved surface, or on a bended surface. These methods and apparatus rely upon a light field camera, which is capable of capturing the directional lighting distribution arriving at each location on the photosensor. Detailed description of a light field camera can be found in the publication authored by Ren Ng. et al., titled "Light Field Photography with a Hand-held Plenoptic Camera," published in Stanford Tech Report CTSR 2005-02.

Figure 6:
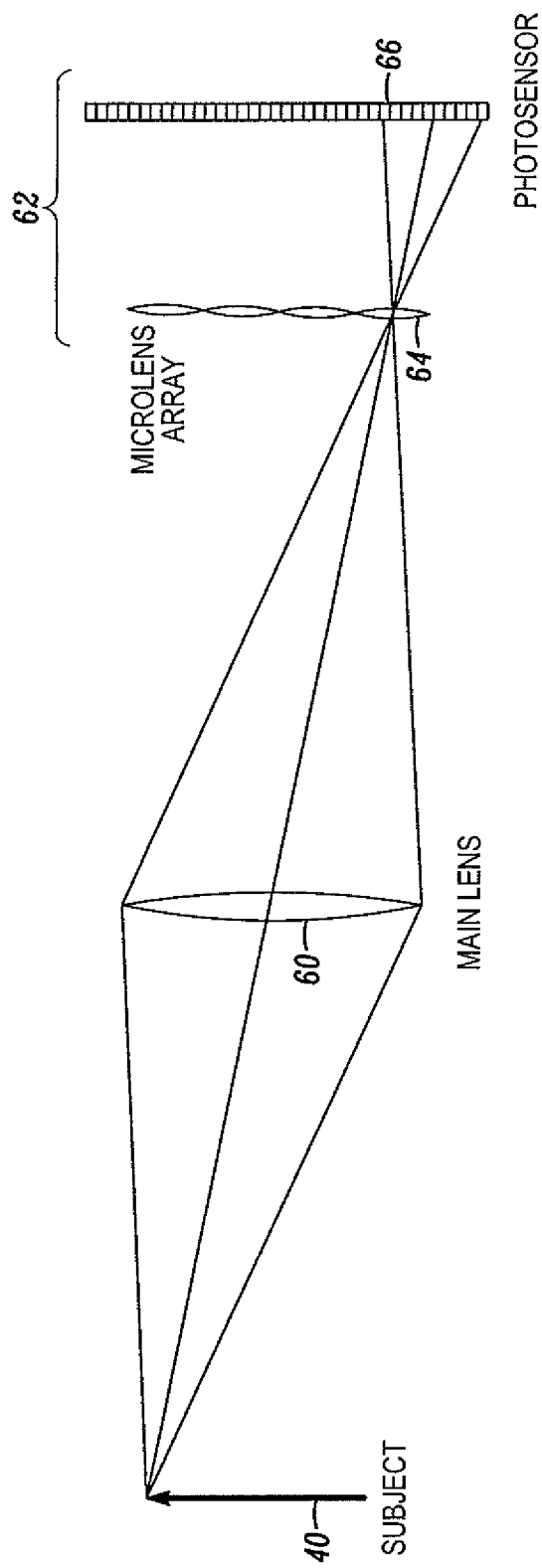
FIG. 6 is a schematic of a light field camera in accordance with some embodiments.

FIG. 6 is a schematic of a light field camera in accordance with some embodiments. The light field camera includes a photographic main lens 60, a microlens array 64, and a photosensor array 66 of finer pitch. FIG. 6 illustrates the layout of these components. The main lens 60 is positioned in front of the microlens array 64. As shown in FIG. 6, rays of light from the subject 40, after passing through the main lens 60 and the microlens array 64, are separated based on their directions and incident upon the array of pixels underneath the microlens.

Figure 7:
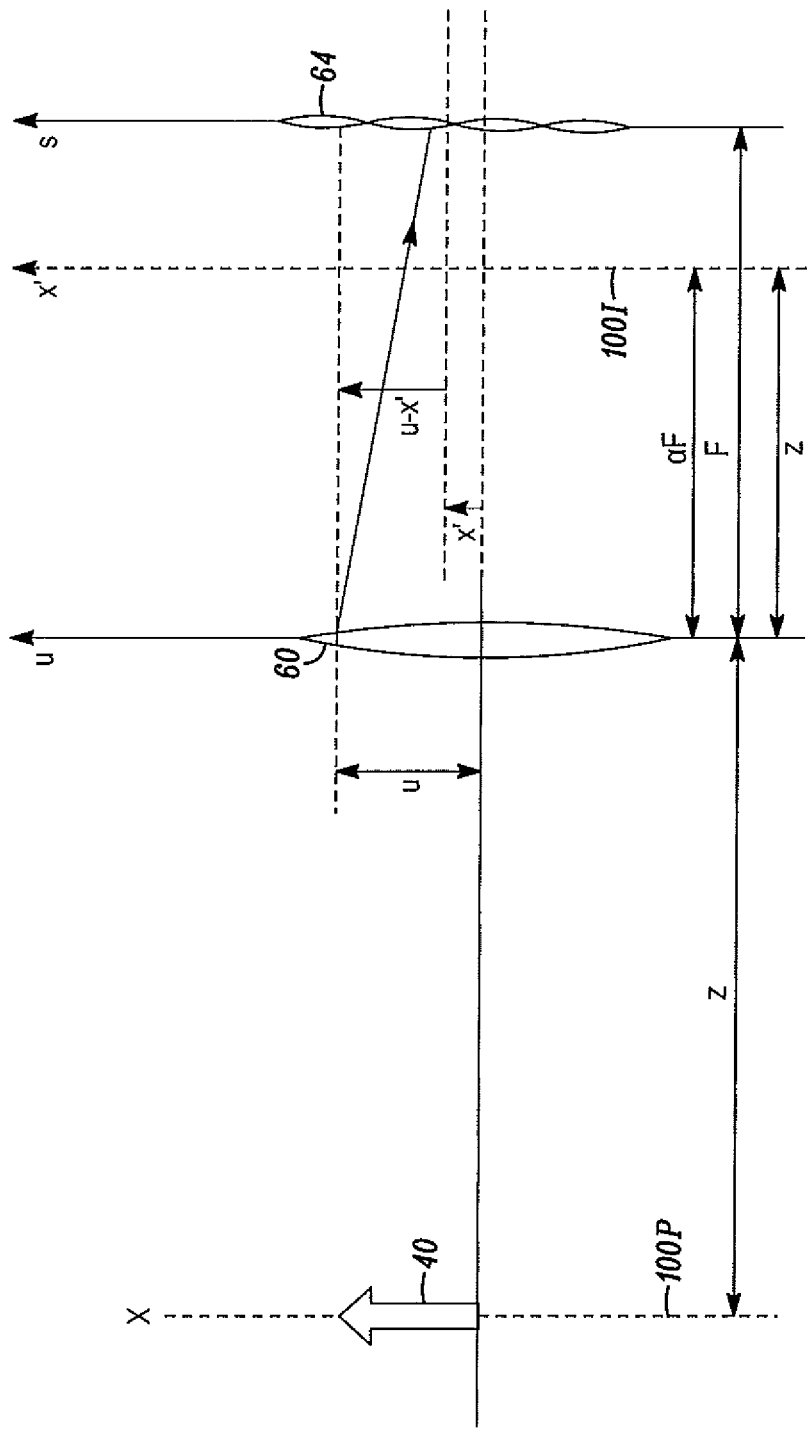
FIG. 7 shows the relationship between different variables for using the light-field data to construct an in-focus image having a user selected focus plane in accordance with some embodiments.

FIG. 7 shows the relationship between different variables for using the light-field data to construct an in-focus image having a user selected focus plane 100P. In FIG. 7, a user selected focus plane 100P is located at a distance z from the main lens 60. A point (x,y) on the focus plane 100P is focused on a corresponding imaging plane 100I at location (x',y'). The constructed in-focus image at the imaging plane 100I is given by the equation, $$E(x', y'; a) = \iint\limits_{(u,v) \text{ on Lens}} L\left(u, v, u + \frac{x' - u}{a}, v + \frac{y' - v}{a}\right) du dv$$

where E (x',y') is the irradiance image value that would have appeared on the synthetic film plane 100I, and L(u,v,s,t) is the acquired light field data that measures the intensity of the light passing through the point (u,v) on the main lens and the point (s,t) on the microlens plane. The integration is over all point (u,v) on the main lens 60, which functions as the aperture A(u,v), with A(u,v)=0 for all points (u,v) that are not on the main lens. In addition, $\alpha$ is the distance z' between the main lens 60 and the synthetic film plane 100I as measured in terms of the focus length F (i.e., z'=$\alpha$F). Furthermore, because of the lens equation, 1/z+1/z'=1/F, $\alpha$ is directly related to the distance z between the focus plane 100P and the main lens 60; that is, $\alpha$=z/(z−F).

Figure 8:
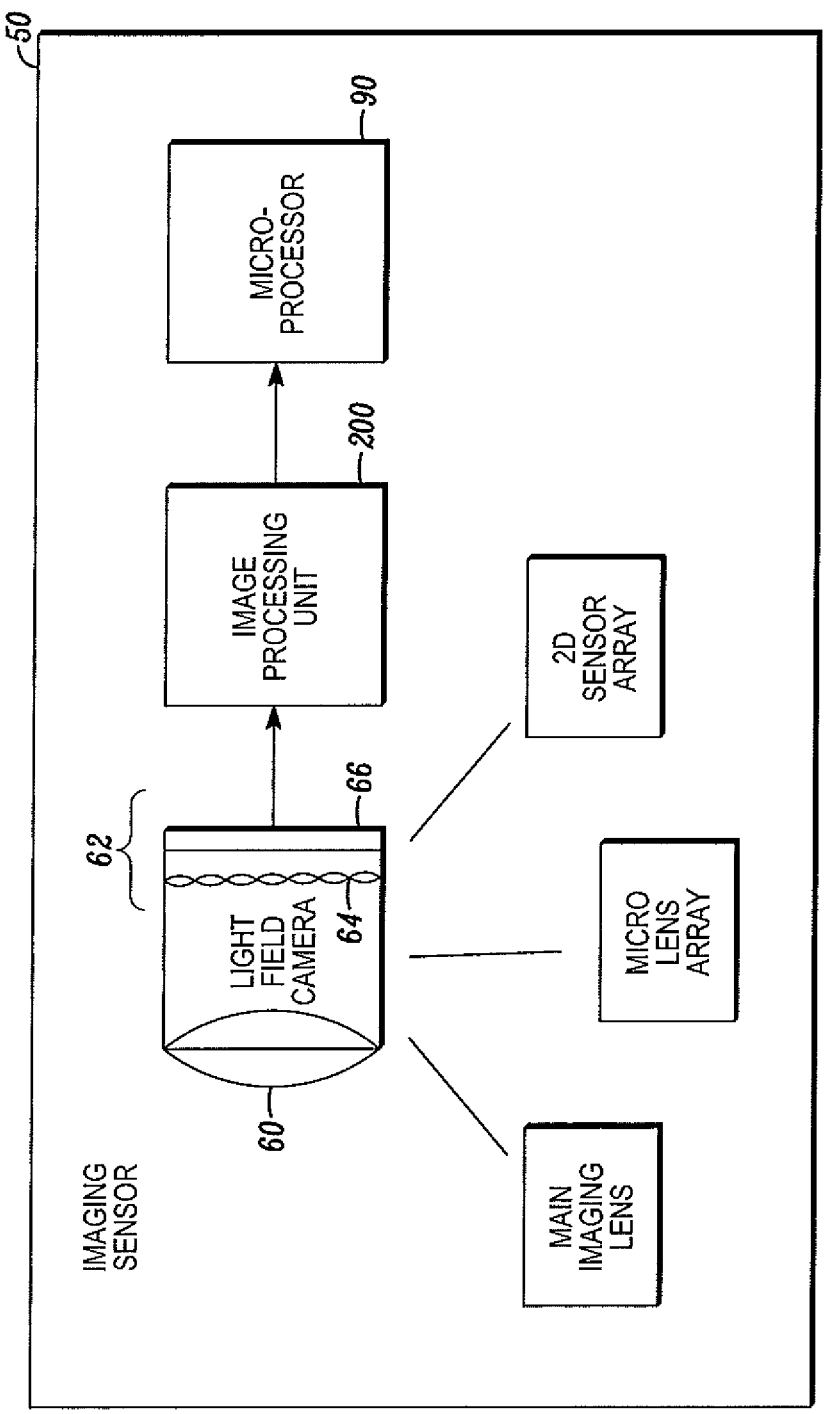
FIG. 8 shows a schematic of an imaging scanner that includes a light field camera in accordance with some embodiments.

Because the in-focus image with different focus planes can be constructed from the light-field data, an imaging scanner including a light field camera can have improved performance. FIG. 8 shows a schematic of an imaging scanner 50 that includes a light field camera in accordance with some embodiments. In FIG. 8, the imaging scanner 50 includes a main imaging lens 60, an imaging sensor 62, an image processing unit (IPU) 200, and a microprocessor 90. The image processing unit (IPU) 200 is operatively connected to the image sensor to receive the light-field data from the image sensor 62. The IPU 200 is configured to generate a stream of image data including image data representing an expected in-focus image of the target object, and the microprocessor 90 is operatively connected to the IPU 200 to process the stream of image data received from the IPU.

In FIG. 8, the image sensor 62 for generating light-field data can include an array of photosensitive elements 66 and an array of microlenses 64 that overlays the array of photosensitive elements with a uniform spacing, A given microlens generally covers multiple photosensitive elements. Each of these multiple photosensitive elements can be located at the focus plane of the given microlens, and each of these multiple photosensitive elements receives light through the same given microlens.

Figure 9:
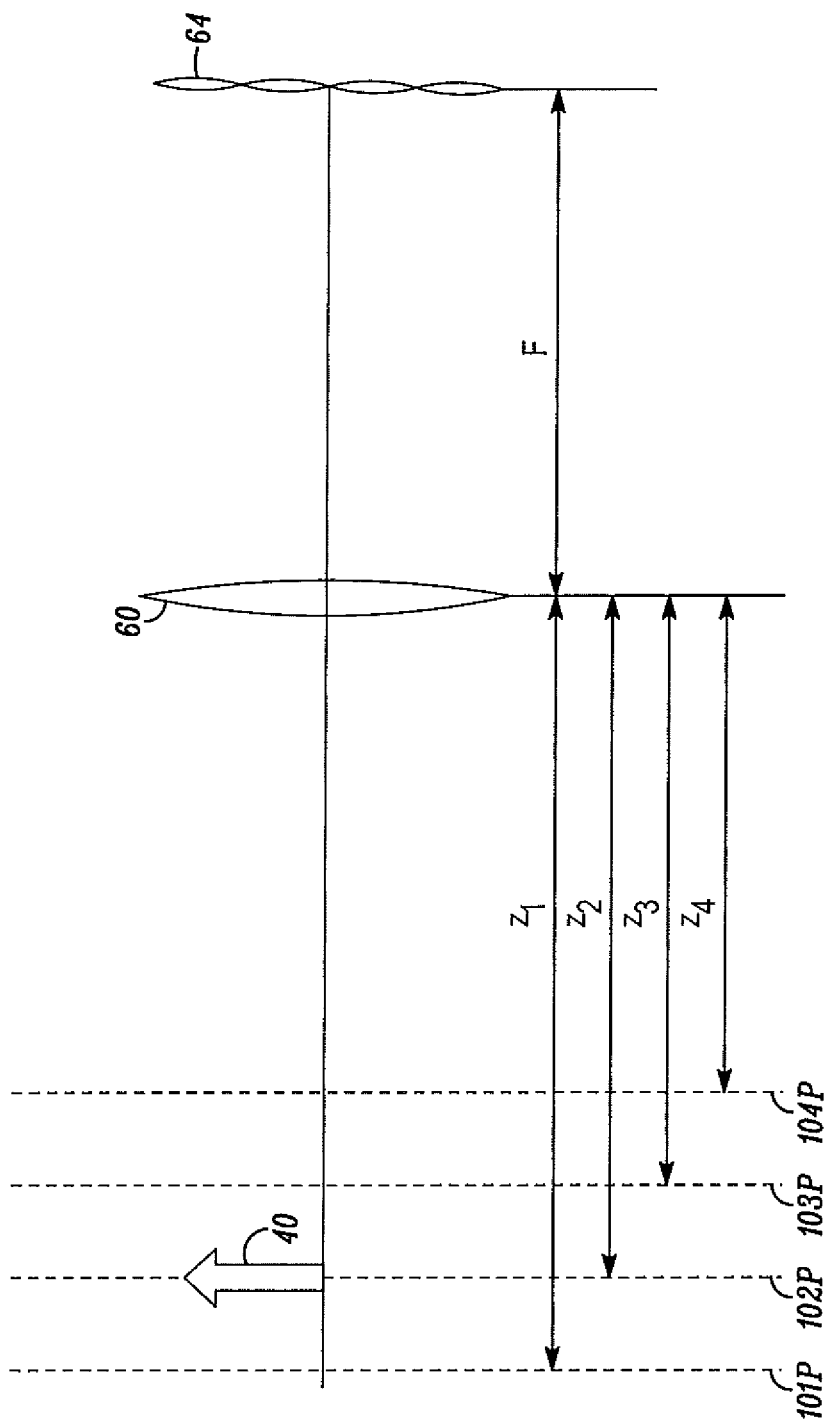
FIG. 9 shows a set of predetermined focus planes that can be used for generating a set of images each using one of the predetermined focus planes as a corresponding focus plane in accordance with some embodiments.

In one embodiment, the IPU 200 is configured to select a set of predetermined focus planes and to generate a set of images of the target object from the light-field data. Each image in the set of images is generated from the light-field data using one of the predetermined focus planes as a corresponding focus plane. In one example, as shown in FIG. 9, the set of predetermined focus planes includes focus planes 101P, 102P, 103P, and 104P. In the figure, $z_1$, $z_2$, $z_3$, and $z_4$ are respectively the distances between the main lens 60 and the focus planes 101P, 102P, 103P, and 104P. The IPU 200 is configured to generate a set of images of the target object from the light-field data, as determined by the following equations: $E_1(x',y')=E(x', y'; \alpha_1)$ with $\alpha_1=z_1/(z_1-F)$, $E_2(x', y')=E(x',y'; \alpha_2)$ with $\alpha_2=z_2/(z_2-F)$, $E_3(x',y')=E(x',y'; \alpha_3)$ with $\alpha_3=z_3/(z_3-F)$, and $E_4(x', y')=E(x',y'; \alpha_4)$ with $\alpha_4=z_4/(z_4-F)$.

In some embodiments, the IPU 200 is configured to generate a stream of image data that includes image data representing each image from the set of images. The microprocessor 90 may attempt to find the image with the best focus to decode the barcode. Alternatively, the microprocessor 90 may simply attempt to decode the barcode found in each of the images received from the IPU 200 until a successful decoding.

In some other embodiments, the IPU 200 is configured to select one image from the set of images generated from the light-field data as the expected in-focus image of the target object. The microprocessor 90 just need to decode the barcode found in this expected in-focus image that is received from the IPU 200. For finding this expected in-focus image, the IPU 200 first find the sharpness of the images from the set of images generated from the light-field data—$E_1(x', y')$, $E_2(x', y')$, $E_3(x', y')$, and $E_4(x', y')$; the IPU 200 then select the image that has better sharpness than the others as the expected in-focus image. This expected in-focus image can be send to the microprocessor 90 for further processing.

Figure 10:
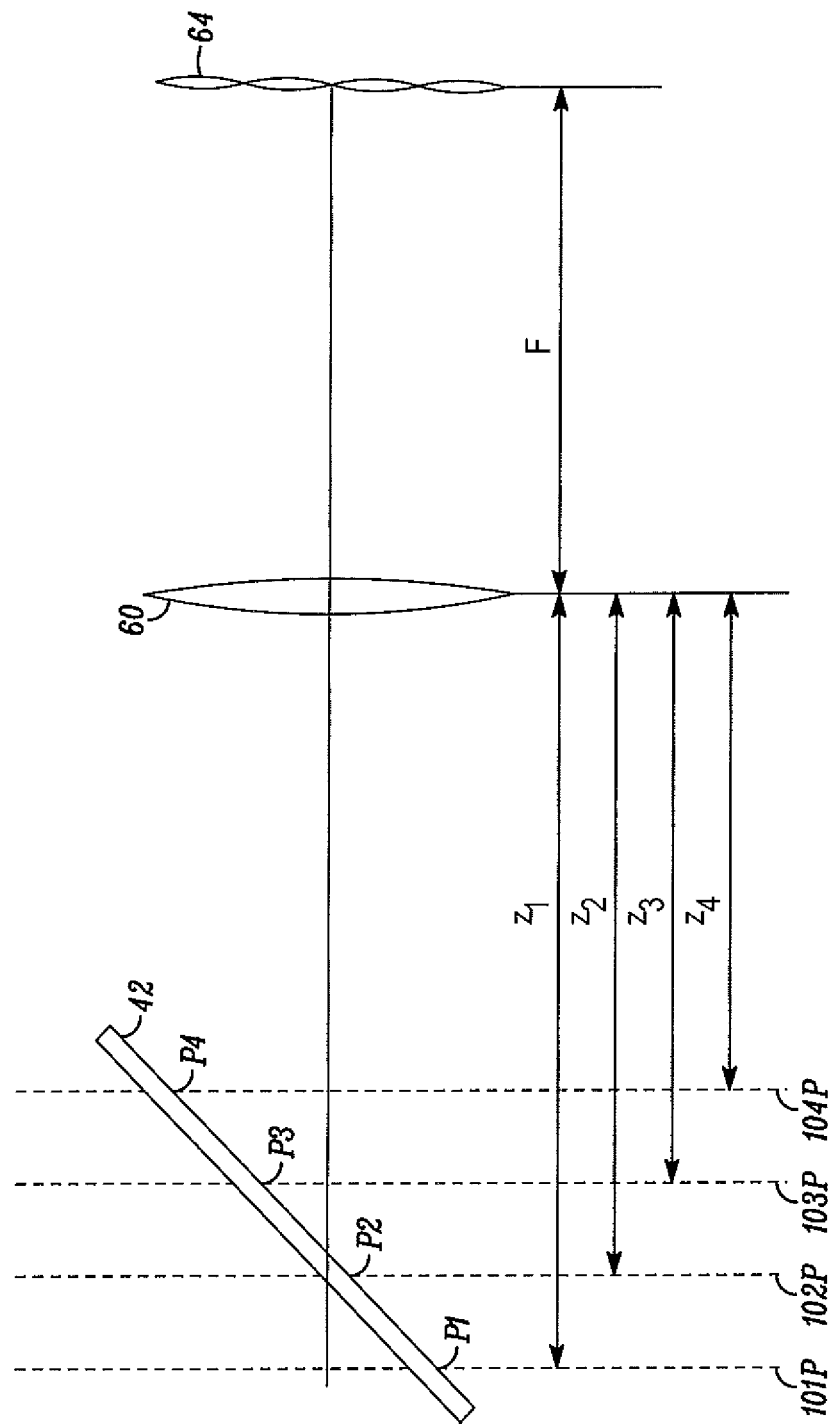
FIG. 10 shows that the barcode can be located on a surface that is not perpendicular to the optical axis of the system.

In some situations, as shown in FIG. 10, the barcode is located on a surface 42 that is not perpendicular to the optical axis of the system. Some parts of the barcode may not be in perfect focus if the selected focus plane is perpendicular to the optical axis. For example, point P1 on the surface 42 has the best focus when focus plane 101P is used for constructing the expected in-focus image, point P2 has the best focus when focus plane 102P is used, point P3 has the best focus when focus plane 103P is used, and point P4 has the best focus when focus plane 104P is used. It is desirable to construct an in-focus image in which points P1, P2, P3, and P4 are all in the best focus.

Figure 11:
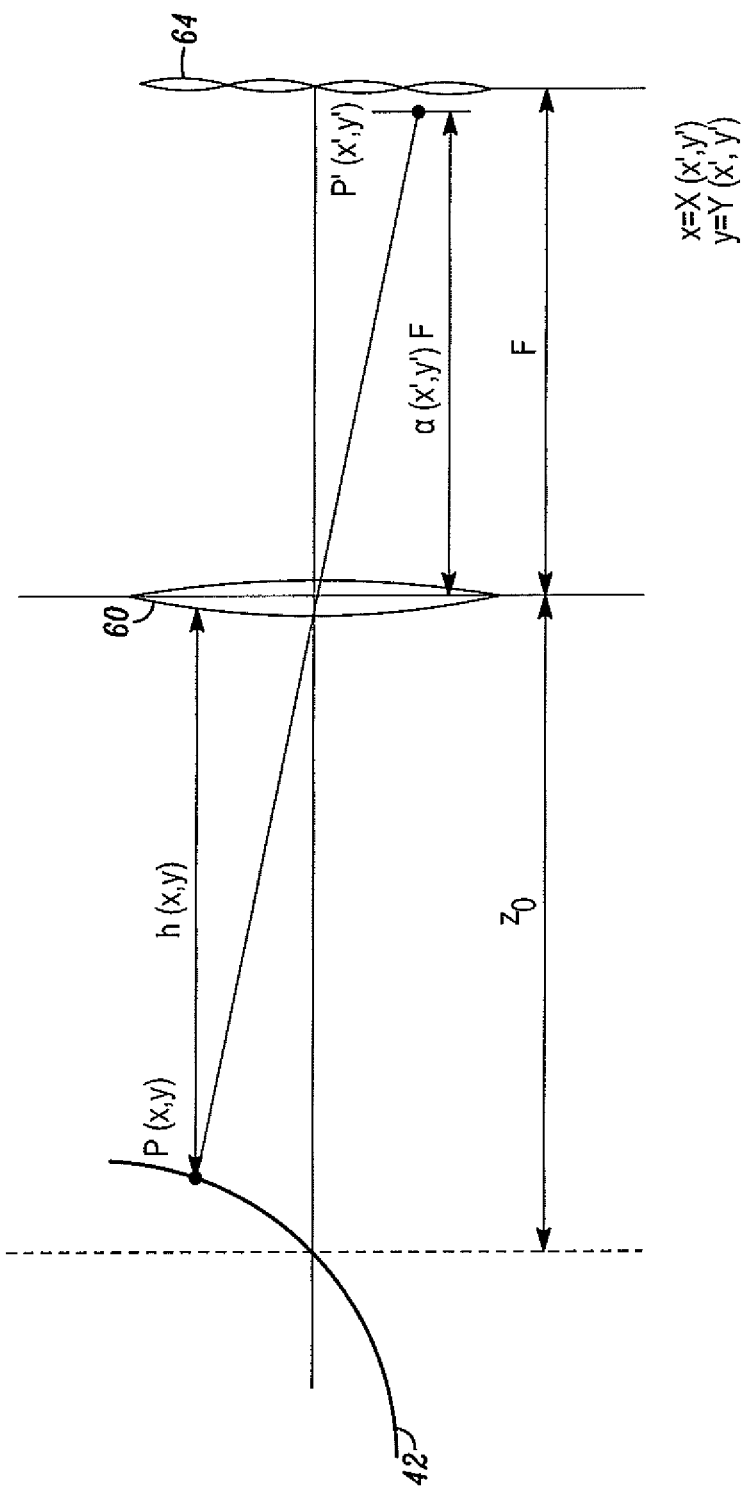
FIG. 11 is a schematic for illustrating how to bring all points on a surface into focus in an expected in-focus image that is generated from the light-field data using some advanced algorithm in accordance with some embodiments.

FIG. 11 is a schematic for illustrating how to bring all points on a surface 42 into focus in an expected in-focus image that is generated from the light-field data using some advanced algorithm in accordance with some embodiments. In FIG. 11, the surface 42 is described by a surface equation z=h(x, y). The light from the point P(x,y) on the surface 42, after passing through the main lens 60, is focused on a corresponding imaging point P'(x', y'). The relationship between the point P(x,y) on the surface 42 and the corresponding imaging point P'(x', y') can be determined based on the known geometric optics equations. Such relationship can be formalistically written as:

$$\begin{cases} x = X(x', y') \\ y = Y(x', y') \end{cases}$$

where the exact form of the functions X(x', y') and Y(x', y') can be easily found by people skilled in the art. The separation between the main lens 60 and the corresponding imaging point P'(x', y') along the direction of the optical axis is α(x', y'), as measured in terms of the focus length F. And this separation can be determined using the surface equation z=h (x, y) and is given by $$\alpha(x',y')=h(x,y)/(h(x,y)-F).$$

The expected in-focus image that can bring all points on a surface 42 into focus can be determined by the following equations:

$$E(x', y') = \iint_{(u,v) \text{ on Lens}} L\left(u, v, u + \frac{x'-u}{a(x', y')}, v + \frac{y'-v}{a(x', y')}\right) du\, dv,$$

with α(x',y') determined by the equation, $$a(x', y') = \frac{h(X(x', y'), Y(x', y'))}{h(X(x', y'), Y(x', y')) - F}$$

In one embodiment, as shown in FIG. 10, the barcode is located on a surface 42 that is tilted with respect to the optical axis with a tilting angel θ. The surface 42 is described by a surface equation z=h(x, y)=d−x cos θ, where d is the distance to the main lens 60 from the surface point at the optical axis. The separation between the main lens 60 and the corresponding imaging point P'(x', y') along the direction of the optical axis is a function of the tilting angel θ and the variable d, that is, $$\alpha(x',y')=h(x,y)/(h(x,y)-F)=\alpha(x',y';d,\theta).$$

The constructed in-focus image Ẽ(x', y'; d) corresponding to a focus surface z=d−x cos θ is given by the equation, $$\tilde{E}(x', y'; d) = \iint_{(u,v) \text{ on Lens}} L\left(u, v, u + \frac{x'-u}{a(x', y'; d, \theta)}, v + \frac{y'-v}{a(x', y'; d, \theta)}\right) du\, dv$$

Figure 12:
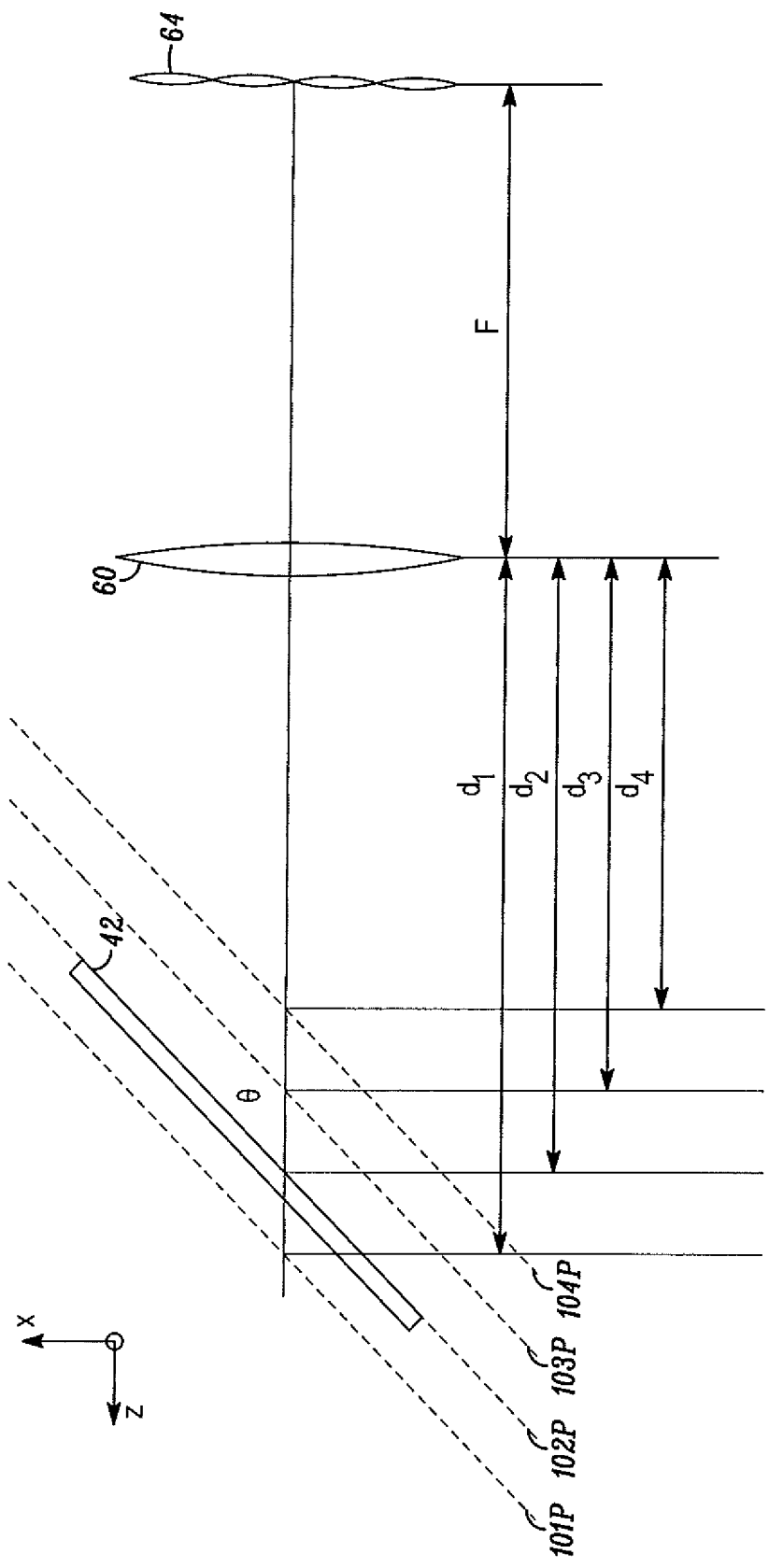
FIG. 12 shows a set of predetermined focus planes each being tilted with respect to the optical axis of the system in accordance with some embodiments.

In one embodiment as shown in FIG. 8, the IPU 200 is configured to select a set of predetermined focus planes and to generate a set of images of the target object from the light-field data. Each image in the set of images is generated from the light-field data using one of the predetermined focus planes as a corresponding focus plane. In one example, as shown in FIG. 12, the set of predetermined focus planes includes focus planes 101P, 102P, 103P, and 104P. Each focus plane is tilted with respect to the optical axis with a constant tilting angel θ. The IPU 200 is configured to generate a set of images of the target object from the light-field data, and the set of the images includes constructed in-focus images Ẽ(x', y'; $d_1$), Ẽ(x', y'; $d_2$), Ẽ(x', y'; $d_3$), and Ẽ(x', y'; $d_4$). In FIG. 12, all points on the surface 42 can be brought into focus in the constructed in-focus image Ẽ(x', y'; $d_2$) using focus plane 102P.

In general, when the orientation of the surface 42 is known, a set of predetermined focus planes each having the same orientation as the surface 42 can be selected. If a set of images is constructed from the light-field data using these predetermined focus planes as the focus plane, it is possible to find one of the constructed image that brings all points on the surface 42 into focus. The orientation of the surface 42 can be independently determined by a number of methods. In one example, the orientation of the surface 42 can be determined with a grid pattern projected onto the surface. In another example, when a document is placed on top of a horizontal table, the orientation of the surface 42 can be determined if the orientation of the handheld scanner is known from the gradiometers inside the handheld scanner. An imaging scanner that can focus on all points on a titled flat surface can be quite useful for document capture and OCR applications.

The previous teachings demonstrate that, with the light-field data, it is possible to bring all points on a flat surface 42 into focus if the orientation of the flat surface 42 is known, and it is also possible to bring all points on a curved surface 42 into focus if the curved surface 42 can be determined and described by a known equation. In many common situations, as shown in FIGS. 4B-4C, the curved surface 42 cannot be readily determined, as the orientation of the curved surface 42 or its distance to the imaging scanner can be quite arbitrary. In these situations, it is still desirable to have a constructed image that have good focus on all points on the curved surface 42, especially in the case that OCR has to be performed on the prints in the curved surface.

Figure 13A:
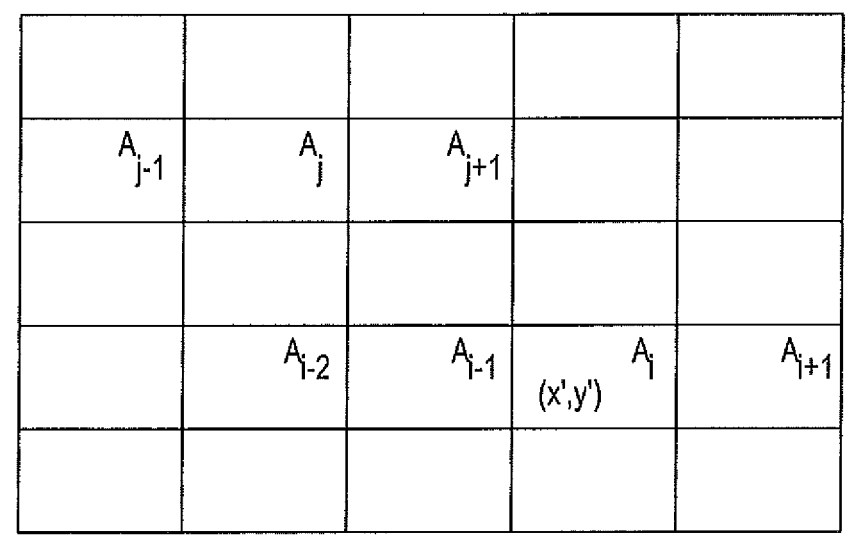
Figure 13B:
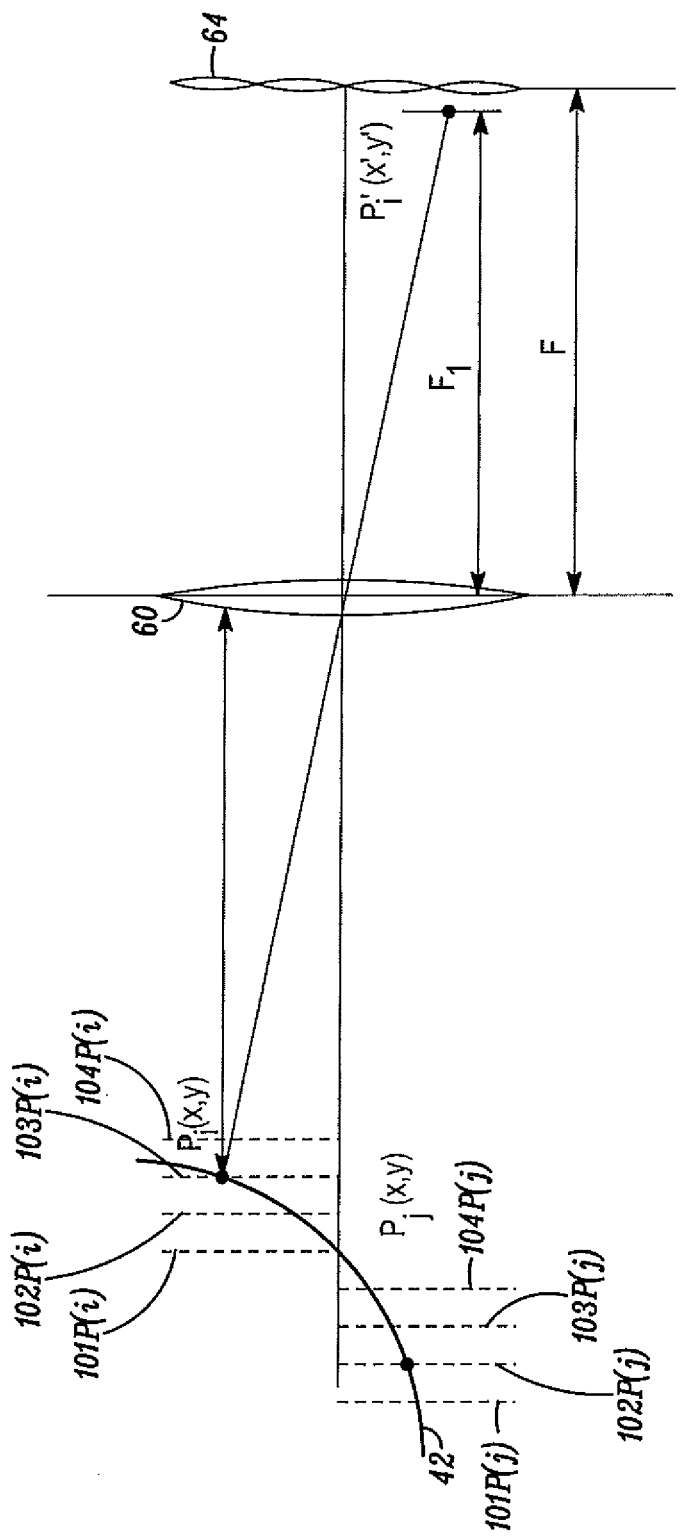

FIGS. 13A-13B illustrate how to construct from the light-field data a constructed image with good focus on all points on an unknown surface in accordance with some embodiments. In FIG. 13A, multiple local in-focus images are generated from the light-field data, and these multiple local in-focus images are combined together to form the expected in-focus image of the target object. As shown in FIG. 13B, for generating a chosen local in-focus image located near imaging point P'(x', y') located in the imaging area $A_i$ in FIG. 13A, an IPU or general microprocessor can first find the sharpness of a set of local images with different corresponding local focus planes 101P(i), 102P(i), 103P(i), and 104P(i) near surface point $P_i$(x, y), where each local image covers essentially the same area on the target object. The IPU or general microprocessor can then select one local image from the set of local images as the chosen local in-focus image wherein the chosen local in-focus image has better sharpness than other images from the set of local images. In FIG. 13B, the local images local focus planes 103P(i) has the best sharpness, and it is selected as the chosen local in-focus image. Similarly, as shown in FIG. 13B, after finding the sharpness of a set of local images with different corresponding local focus planes 101P(j), 102P(j), 103P(j), and 104P(j) near surface point $P_j$(x, y), the local images local focus planes 102P(j) with the best sharpness is selected as the chosen local in-focus image corresponding to the imaging area $A_j$ in FIG. 13A.

The finding of sharpness can be done in many ways. For example, one way is to simply find the Root-Mean-Square value of the pixels—the larger the RMS value, the sharper we consider the image to be. For another example, the standard deviation of the pixel values can be used to measure sharpness—again, the larger the standard deviation, the sharper the image. If for a local area all images thus derived have the same sharpness (for example, if the local region has no contrast at all), then any of the local images can be taken. The local image, or a portion of it, is sent out as part of the resultant image. Once this is done, some of the storage used to store the data can be freed up to store new data acquired from the IFC. Therefore, the IPU does not have to have the memory to store the data associated with a complete image. a barcode on an inclined surface, on a curved surface, or on a bended surface.

While the constructed image with good focus on all points on an unknown surface can be construct from a light-field data using both an IPU and general microprocessor, using the IPU to process the light-field data can have certain advantages. In some situations, the light-field camera ("LFC") may not be directly applicable to the application of barcode scanners, because (a) The amount of data acquired is much larger, usually by an order of magnitude or more; (b) The transfer of large amount of data takes up more time, reducing the decoder responsiveness; (c) The amount of data requires more storage, which may unnecessarily increase cost; (d) The refocusing of the data also takes CPU power and time; (e) The image processing capabilities of decoding software may not be directly applicable to the complex light field data that is made available by the LFC. Thus the LFC may not directly suitable for many existing designs of the imaging barcode scanners which tend to have comparably slower CPU (due to cost and to the power consumption), more limited amount of memory, and must respond faster than typical digital cameras.

The image processing unit (IPU) can take the data from the LFC and processes it to produce an in-focus regular image, and only sends the resultant image to the scanner's main microprocessor. Because the microprocessor only gets an in-focus, regular image, the software running in the microprocessor does not need to be changed. The IPU takes data from the LFC, and buffers up a few lines of data. When the data buffer is filled to a predetermined degree, it starts processing the data. The data processing consists of producing a set of local images, each representing a different focus location, and comparing them in order to find the one with the best sharpness.

The IPU helps to alleviate many of the problems associated with the method of processing data from the LFC directly using the scanner's main microprocessor. The amount of data sent to the CPU is reduced. The IPU can utilize a data transfer rate to the LFC that is higher than the data transfer rate to the microprocessor. The microprocessor does not perform extra work. Also, the software does not need to be changed. Other than a slight delay for the IPU to fill up the data buffer, the IPU processes the data in real time.

Figure 14:
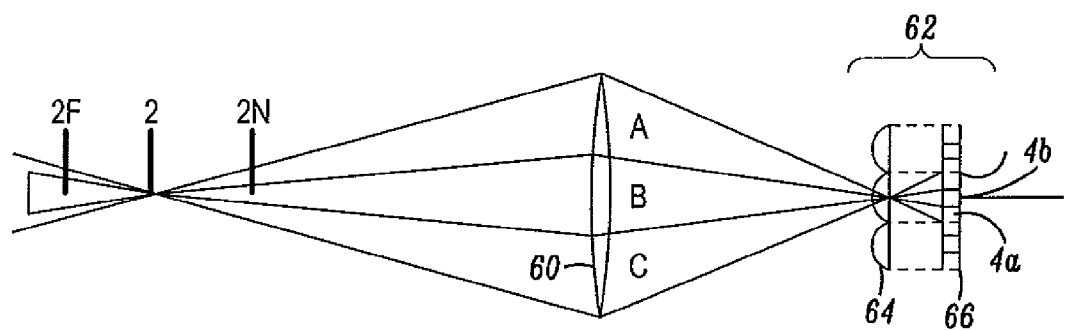
FIG. 14 is a schematic for illustrating how to measure direction of the defocus correction in the captured frame in accordance with some embodiments.

In addition to using an IPU to speed up the process to find an expected in-focus image of the target object, it is also desirable to find other methods for quickly finding the expected in-focus image of the target object. FIG. 14 is a schematic for illustrating how to measure direction of the defocus correction in the captured frame in accordance with some embodiments. In FIG. 14, the main lens 60 images a target with a bar-code 2 onto the micro lens array 64. Behind each micro lens there are 3×3 sub-pixels of the 2D array (in a conventional camera, there is one pixel behind each micro lens). In FIG. 14, it is assumed that a bar-code that can be located in one of three possible conjugate planes: the conjugate plane 2, the conjugate plane 2N, and the conjugate plane 2F. Here, the conjugate plane 2N is closer to the imaging sensor 62 than the conjugate plane 2, and the conjugate plane 2F is further away. In FIG. 14, an edge of a bar is located on the optical axis so it is imaged on the central micro-lens (the whole discussion would be the same if the edge would be imaged to any other micro-lens). Due to an imaging property of the base lens 60, micro-lenses below the central one will received less light than the micro lenses above. When a bar-code is in plane 2, all points on a bar edge diffuse light equally toward sub-apertures A, B, and C thus producing the same signals of sub-pixels 4a, 4b, and 4c. When bar-code is located at the plane 2N, sub-pixel 4a will receive less light than 4c. Therefore, black-to-white transition among micro-lenses (summed up sub-pixels) will be in the same direction as among sub-pixel. It can be seen that, if a bar-code is located at a plane 2F, the black-to-white transition between micro-lenses and sub-pixels goes in opposite direction. Therefore, comparing direction of black-to-white transition between micro-lenses and sub-pixels, the system automatically determines if bar-code is located at the conjugate plane 2 or closer or further. Based on difference in sub-pixel signal, not only direction but a magnitude of the required digital refocus can be determined.

Defocus correction in the capture image can be achieved based on information about intensity of light coming to each micro-lens from different sub-apertures of lens 60 which is determined by distribution among sub-pixel signals. Then a ray tracing can be used to synthesize an image corresponding to the micro-lens array located closer or further from the base lens than it is physically located. Based on a known direction of the defocus, a sharper bar-code image can be reconstructed quickly from the taken single frame enabling decoding of the bar-code. In some embodiments, the light field imaging sensor can have 10×10 sub-pixels behind each micro-lens for achieving good digital image refocusing. In some other embodiments, the light field imaging sensor can have 3×3 sub-pixels behind each micro-lens for achieving a reasonably good digital image refocusing. The above described method for selecting one of the three conjugate panes as a preferred focus plane can be applied to both the 2d imagers and the linear imagers. Furthermore, in some embodiments, the black-to-white transition among micro-lenses is provided by imaging an edge of a barcode. In other embodiments, the black-to-white transition can be provided by projecting on the target a grid light pattern or other light patterns with shape intensity transitions. Using method of defocus correction described above, for a quick bar-code reading, it is possible to make the digital focusing a part of the imager firmware, either by cycling through 2-3 focus positions or automatically choosing sign and amount of digital focus compensation.

Another method for providing a quick bar-code reading is to dynamically determine an optimized synthesized aperture based on an intensity of light received from the target object, and to use the optimized synthesized aperture to construct the expected in-focus image of the target object from the light-field data.

In one specific implementation, as shown in FIG. 14, the main lens 60 images a target with a bar-code 2 onto the micro lens array 64. Behind each micro lens there are 3×3 sub-pixels of the 2D array (in a conventional camera, there is one pixel behind each micro lens). Each micro lens images aperture of the main lens 60 onto the photosensor array 66, so that each of 3×3 sub-pixel receives light from a corresponding sub-aperture of the lens 60. The three shown sub-pixels behind the central micro-lens receive light accordingly from sub-apertures A, B, C of the main lens. At high ambient light condition or when an extended depth of field is needed, image can constructed only from central sub-pixels 4b receiving light from only the central sub-aperture B of the main lens that is ⅓ of the full lens aperture. (Actually, 8 other images can be constructed from the same frame by selecting other sub-pixels, all with increased depth of focus; summation of these images can increase the image SNR). At low ambient light conditions or to overcome diffraction limits of the small central aperture, and image can be formed by summation of all sub-pixel behind each micro lens.

Figure 15A:
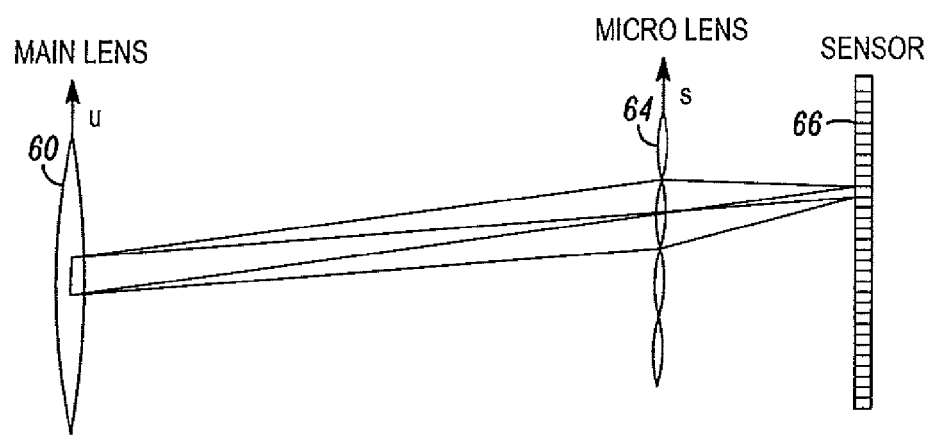
FIGS. 15A-15C depict light passing through the sub-aperture are focused on corresponding pixels through different microlenses for forming photograph images.
Figure 15B:
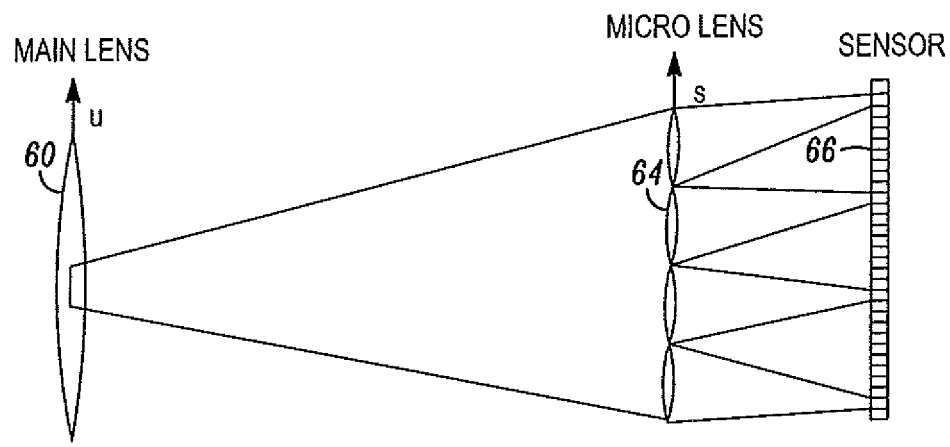
Figure 15C:
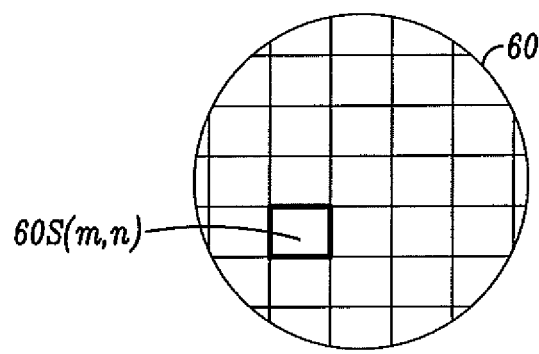

FIG. 15A shows that all the light that passes through a pixel passes through its parent microlens and through its conjugate square (sub-aperture) on the main lens. FIG. 15B shows that all rays passing through the sub-aperture are focused through corresponding pixels under different microlenses. These pixels form the photograph seen through this sub-aperture 60S (m, n), as shown in FIG. 15C, where the indexes m and n can take integer values for labeling different sub-apertures on the main lens 60.

Figure 16A:
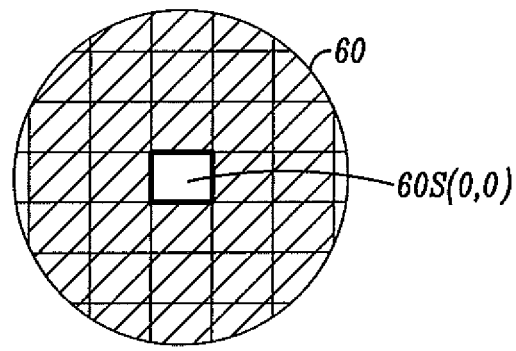
FIGS. 16A-16D depict that an optimized synthesized aperture can be dynamically changed based on an intensity of light received from the target object and based on the type of the barcode to be read.
Figure 16B:
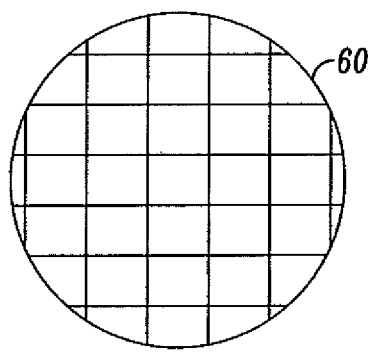
Figure 16C:
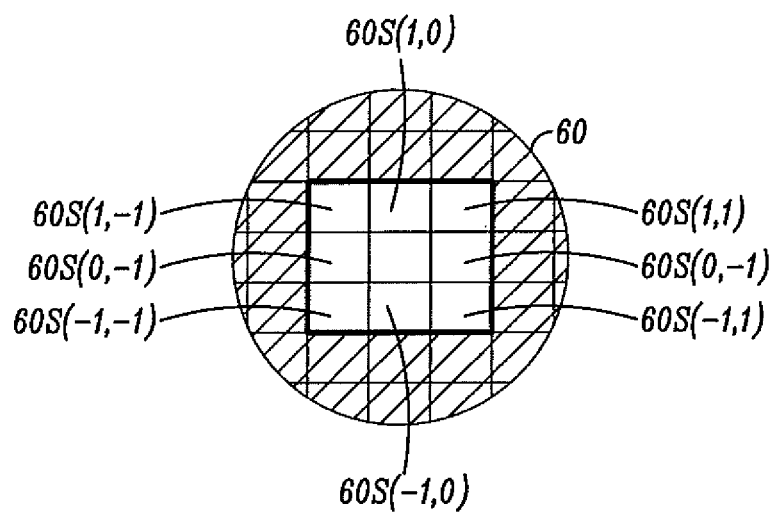
Figure 16D:
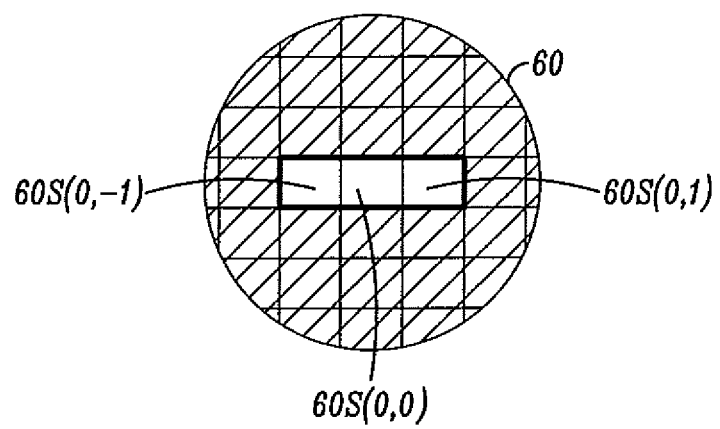

FIGS. 16A-16D depict that an optimized synthesized aperture can be dynamically changed based on an intensity of light received from the target object and based on the type of the barcode to be read. In FIG. 16A, a center sub-aperture 60S (0,0) is chosen to optimize the death of the focus when the barcode receives sufficient amount of illumination. In FIG. 16B, all sub-apertures covering the mainlens 60 are chosen to maximize the amount of light impinge upon the photosensor array 66. In FIG. 16C, nine center sub-apertures are chosen to make some compromise between the death of the focus and the amount of light received by the photosensor array 66. The nine center sub-apertures are sub-apertures 60S(1,−1), 60S(1,0), 60S(1,1), 60S(0,−1), 60S(0,0), 60S(0,1), 60S(−1,−1), 60S(−1,0), and 60S(−1,1). In FIG. 16D, three sub-apertures are chosen for imaging a linear barcode and for making some compromise between the death of the focus and the amount of light received by the photosensor array 66. The three sub-apertures are sub-apertures 60S(0,−1), 60S(0,0), and 60S(0, 1). There are some advantages for using the optimized synthesized aperture to construct the expected in-focus image of the target object from the light-field data. This process of constructing the expected in-focus image of the target object can be relatively quick, because the constructing process generally involves summation of the light intensity detected by some selected photosensors in the photosensor array 66. Such summation can involve merely simple summation or weighted summation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
 an illumination source for providing illumination directed toward a target object;
 an image sensor for generating light-field data, wherein the image sensor comprises (1) an array of photosensitive elements and (2) an array of microlenses that overlays the array of photosensitive elements with a uniform spacing, wherein a microlens covers multiple photosensitive elements each receiving light through the microlens to function as a sub-pixel;

an image processing unit (IPU) operatively connected to the image sensor to receive the light-field data from the image sensor, the IPU being operative to generate a stream of image data including image data representing an expected in-focus image of the target object; and a controller operatively connected to the IPU to process the stream of image data received from the IPU.

2. The apparatus of claim 1, wherein the IPU is configured for:

selecting a set of predetermined focus planes; and constructing a set of images of the target object from the light-field data, wherein each image in the set of images is constructed from the light-field data using one of the predetermined focus planes as a corresponding focus plane.

3. The apparatus of claim 2, further comprising:

a lens arrangement positioned in front of the image sensor; and wherein each predetermined focus plane is titled with respect an optical axis of the lens arrangement.

4. The apparatus of claim 2, wherein the IPU is configured for:

generating a stream of image data including image data representing each image from the set of images.

5. The apparatus of claim 2, wherein the IPU is configured for:

selecting one image from the set of images constructed from the light-field data as the expected in-focus image of the target object, wherein the one image that is selected has better sharpness than other images from the set of images.

6. The apparatus of claim 1, wherein the IPU is configured for:

constructing multiple local in-focus images from the light-field data; and combining the multiple local in-focus images together to form the expected in-focus image of the target object.

7. The apparatus of claim 6, wherein the multiple local in-focus images includes more than one local in-focus image constructed from the light-field data, and constructing a chosen local in-focus image comprises:

finding the sharpness of a set of local images with different corresponding local focus planes and with each local image covering essentially the same area on the target object; and selecting one local image from the set of local images as the chosen local in-focus image, wherein the chosen local in-focus image has better sharpness than other images from the set of local images.

8. The apparatus of claim 7, wherein the IPU is configured for:

transferring the chosen local in-focus image to the controller; and after the transferring the chosen local in-focus image, reusing the memory used for calculating the chosen local in-focus image to calculate another local in-focus image.

9. The apparatus of claim 1, wherein the IPU is configured for:

selecting three predetermined focus planes;

constructing automatically three images of the target object from the light-field data, wherein each of the three images is constructed from the light-field data using one of the three predetermined focus planes as a corresponding focus plane; and generate a stream of image data including image data representing each of the three images.

10. The apparatus of claim 1, wherein the IPU is configured for:

constructing a reference image of the target object from the light-field data using a first focus plane as a corresponding focus plane;

comparing the reference image with an intensity distribution in the sub-pixels to selected one of a near focus plane, a far focus plane, and the first focus plane as a next focus plane, wherein the first focus plane is located between the near focus plane and the far focus plane; and using the next focus plane to construct the expected in-focus image of the target object from the light-field data.

11. The apparatus of claim 10 wherein said comparing the reference image with an intensity distribution in the sub-pixels comprises:

comparing direction of black-to-white transition between micro-lenses and sub-pixels.

12. The apparatus of claim 1, wherein the IPU is configured for:

determining an optimized synthesized aperture based on an intensity of light received from the target object; and using the optimized synthesized aperture to construct the expected in-focus image of the target object from the light-field data.

13. The apparatus of claim 1, wherein the amount of data transferred to the controller from the IPU is substantially less than the amount of data the IPU receives from the image sensor.

14. A method of imaging a target object with an imaging reader, the method comprising:

detecting light from the target object through a lens arrangement with an image sensor to generate light-field data, wherein the image sensor comprises (1) an array of photosensitive elements and (2) an array of microlenses that overlays the array of photosensitive elements with a uniform spacing, wherein a microlens covers multiple photosensitive elements each receiving light through the microlens to function as a sub-pixel;

generating a stream of image data including image data representing an expected in-focus image of the target object, a stream of image data being generated from the light-field data; and processing the expected in-focus image of the target object to decode a barcode on the target object.

15. The method of claim 14, further comprising:

selecting a set of predetermined focus planes each being titled with respect an optical axis of the lens arrangement; and constructing a set of images of the target object from the light-field data, wherein each image in the set of images is constructed from the light-field data using one of the predetermined focus planes as a corresponding focus plane.

16. The method of claim 15, further comprising:

generating a stream of image data including image data representing each image from the set of images.

17. The method of claim 15, further comprising:

selecting one image from the set of images constructed from the light-field data as the expected in-focus image of the target object, wherein the one image that is selected has better sharpness than other images from the set of images.

18. The method of claim 14, further comprising:
constructing multiple local in-focus images from the light-field data; and
combining the multiple local in-focus images together to form the expected in-focus image of the target object.

19. The method of claim 18, wherein the multiple local in-focus images includes more than one local in-focus image constructed from the light-field data, and constructing a chosen local in-focus image comprises:
finding the sharpness of a set of local images with different corresponding local focus planes and with each local image covering essentially the same area on the target object; and
selecting one local image from the set of local images as the chosen local in-focus image, wherein the chosen local in-focus image has better sharpness than other images from the set of local images.

20. The method of claim 14, further comprising:
selecting three predetermined focus planes;
constructing automatically three images of the target object from the light-field data, wherein each of the three images is constructed from the light-field data using one of the three predetermined focus planes as a corresponding focus plane; and
generate a stream of image data including image data representing each of the three images.

21. The method of claim 14, further comprising:
constructing a reference image of the target object from the light-field data using a first focus plane as a corresponding focus plane;
comparing the reference image with an intensity distribution in the sub-pixels to selected one of a near focus plane, a far focus plane, and the first focus plane as a next focus plane, wherein the first focus plane is located between the near focus plane and the far focus plane; and
using the next focus plane to construct the expected in-focus image of the target object from the light-field data.

22. The method of claim 14, wherein said comparing the reference image with an intensity distribution in the sub-pixels comprises:
comparing direction of black-to-white transition between micro-lenses and sub-pixels.

23. The method of claim 14, further comprising:
determining an optimized synthesized aperture based on an intensity of light received from the target object; and
using the optimized synthesized aperture to construct the expected in-focus image of the target object from the light-field data.

24. A method of imaging a target object with an imaging reader, the imaging reader including an image sensor that comprises (1) an array of photosensitive elements and (2) an array of microlenses that overlays the array of photosensitive elements with a uniform spacing, wherein a microlens covers multiple photosensitive elements each receiving light through the microlens, the method comprising:
acquiring light-field data by the image sensor;
constructing multiple local in-focus images from the light-field data;
combining the multiple local in-focus images together to form an expected in-focus image of the target object; and
wherein constructing a given local in-focus image among the multiple local in-focus images comprises,
finding the sharpness of a set of local images with different corresponding local focus planes and with each local image covering essentially the same area on the target object, and
selecting one local image from the set of local images as the given local in-focus image, wherein the given local in-focus image has better sharpness than other images from the set of local images.

25. The method of claim 24, further comprising:
processing the expected in-focus image of the target object to decode a barcode on the target object.

26. A method of imaging a target object with an imaging reader, the imaging reader including an image sensor that comprises (1) an array of photosensitive elements and (2) an array of microlenses that overlays the array of photosensitive elements with a uniform spacing, wherein a microlens covers multiple photosensitive elements each located at a focus plane of the microlens and each receiving light through the microlens to function as a sub-pixel, the method comprising:
acquiring light-field data by the image sensor;
using a first focus plane to construct a first expected in-focus image from the light-field data and processing the first expected in-focus image of the target object to decode a barcode on the target object;
if the barcode is not successfully decoded from processing the first expected in-focus image,
(1) finding at least one intensity transition edge in the first expected in-focus image; and
(2) comparing a transition direction of the at least one intensity transition edge with an intensity distribution in the sub-pixels to selected one of a predetermined near plane and a predetermined far plane as a next focus plane, and
(3) using the next focus plane to construct a next expected in-focus image from the light-field data and processing the next expected in-focus image of the target object to decode the barcode on the target object; and
wherein the predetermined near plane is located closer to the image sensor than the first focus plane, and the predetermined far plane is located further away from the image sensor than the first focus plane.

* * * * *